United States Patent [19]

Ramey et al.

[11] 3,928,330

[45] Dec. 23, 1975

[54] SUBSTITUTED PIPERAZINEDIONE CARBOXYLIC ACIDS AND METAL SALTS THEREOF

[75] Inventors: Chester E. Ramey, Spring Valley; John J. Luzzi, Carmel, both of N.Y.

[73] Assignee: Ciba-Geigy Corporation, Ardsley, N.Y.

[22] Filed: Dec. 19, 1973

[21] Appl. No.: 426,425

[52] U.S. Cl.... 260/242; 260/45.75 R; 260/45.75 K; 260/45.75 N; 260/268 DK; 260/268 TR
[51] Int. Cl.² ........................................ C07D 295/10
[58] Field of Search ............................. 260/242, 268

[56] References Cited
UNITED STATES PATENTS
3,728,348   4/1973   Lee et al. ............................ 260/268

Primary Examiner—Harry I. Moatz
Attorney, Agent, or Firm—Nestor W. Shust

[57] ABSTRACT

Substituted piperazinedione carboxylic acids and metal salts thereof are stabilizers for synthetic polymeric materials normally subject to deterioration caused by ultraviolet light. The acids may be formed by reacting together the alkali or alkaline earth metal salts of a substituted piperazinedione and of a haloalkanoic acid and then acidifying. The metal salts of the acids are readily prepared by reacting the acids or their salts with a reactive form of the metal or metal complex. Polymeric compositions containing these stabilizers may also contain a hindered phenolic compound. A typical embodiment is 6-(15-{7,15-diazadispiro[5,1,5,3]hexadecane-14,16-dione})hexanoic acid.

12 Claims, No Drawings

SUBSTITUTED PIPERAZINEDIONE CARBOXYLIC ACIDS AND METAL SALTS THEREOF

BACKGROUND OF THE INVENTION

This invention relates to the stabilization of organic material normally tending to deteriorate. In particular, the invention relates to the protection of synthetic polymers against the harmful degradative effects, such as discoloration and embrittlement caused by exposure to light, especially ultraviolet light.

It is known that actinic radiation, particularly in the near ultraviolet region, has a deleterious effect on both the appearance and properties of organic polymers. For example, normaly colorless or light colored polyesters yellow on exposure to sunlight as do such cellulosics as cellulose acetate. Polystyrene discolors and cracks, with accompanying loss of its desirable physical properties when exposed to actinic light, while vinyl resins, such as polyvinyl chloride and polyvinyl acetate spot and degrade. The rate of air oxidation of polyolefins such as polyethylene and polypropylene is materially accelerated by ultraviolet light.

It has been proposed to stabilize polymeric materials against ultraviolet light deterioration by the use of various types of ultraviolet absorbers. Thus, U.S. Pat. No. 3,004,896 discloses for this purpose 2(2-hydroxyphenyl)benzotriazole derivatives, while U.S. Pat. No. 3,189,630 discloses certain metal salts of hydroxybenzoic acids which are useful as actinic stabilizers in synthetic polymers.

DETAILED DISCLOSURE

The present invention is directed to a class of ultraviolet light stabilizers which consist of a compound of the formula

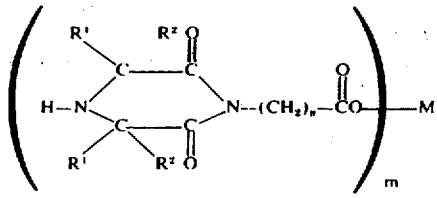

wherein
$R^1$ and $R^2$ are independently of each other methyl or ethyl or together with the carbon to which they are bound form a cyclopentyl or cyclohexyl ring, which is unsubstituted or substituted with a methyl group;
$n$ is an integer of from 1 to 12;
M is hydrogen, dialkyl tin or a metal selected from the group consisting of barium, nickel, manganese, calcium, zinc, iron, sodium, cobalt, and tin; and
$m$ has a value of from 1 to 4, the value of $m$ being the same as the available valence of M.

By the term alkyl as represented by $R^1$ and $R^2$ is intended methyl or ethyl, with methyl being the preferred substituent. Representative of the cycloalkyl groups, as represented by $R^1$ and $R^2$, are cyclohexyl, cyclopentyl, 2-methyl, 3-methyl and 4-methylcyclohexyl, and 2-methyl and 3-methylcyclopentyl. The preferred cycloalkyl groups are cyclohexyl and 2-methylcyclohexyl.

In a preferred embodiment of the compound of formula I, $n$ is an integer of from 1 to 10; more preferably, when $n$ is 1 to 10, $m$ has a value of 1 or 2 with the most preferred substituents represented by M being hydrogen, nickel and manganese.

This invention also relates to compositions of matter which are stabilized against ultraviolet light deterioration which comprises a synthetic organic polymer normally subject to ultraviolet deterioration containing from about 0.005% to 5% by weight of the polymer of the compounds of formula I and preferably from 0.01 to 2% by weight.

The substituted piperazinedione carboxylic acids and metal salts thereof, as represented by formula I, can be used in combination with other light stabilizers such as 2(2-hydroxyphenyl)benzotriazoles, 2-hydroxybenzophenones, nickel complexes and benzoates.

The compounds of this invention are stabilizers or organic material normally subject to thermal, oxidative or actinic light deterioration. Materials which are thus stabilized include synthetic organic polymeric substances including homopolymers, copolymers, and mixtures thereof, such as vinyl resins formed from the polymerization of vinyl halides or from the copolymerization of vinyl halides with un-saturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrene; poly-$\alpha$-olefins such as high and low density polyethylene, cross-linked polyethylene, polypropylene, poly(4-methylpentene-1 and the like, including copolymers of $\alpha$-olefins; such as ethylene-propylene copolymers, and the like; dienes such as polybutadiene, polyisoprene, and the like, including copolymers with other monomers; polyurethanes such as are prepared from polyols and organic polyisocyanates, and polyamides such as polyhexamethylene adipamide and polycaprolactam; polyesters such as polyethylene terephthalates; polycarbonates such as those prepared from bisphenol-A and phosgene; polyacetals such as polyethylene terephthalate polyacetal; polystyrene, polyethyleneoxide; polyacrylics such as polyacrylonitrile; polyphenyleneoxides such as those prepared from 2,6-dimethylphenol and the like; and copolymers such as those of polystyrene containing copolymers of butadiene and styrene and those formed by the co-polymerization of acrylonitrile, butadiene and/or styrene.

Other materials which can be stabilized by the compounds of the present invention include lucricating oil of the aliphatic ester type, i.e., di(1,2-ethylene)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like; and alkylene glycols, e.g., $\beta$-methoxyethyleneglycol, methoxytriethyleneglycol, triethylene glycol, octaethyleneglycol, dibutyleneglycol, dipropyleneglycol and the like.

The compounds of this invention are particularly useful as UV light stabilizers, especially for the protection of polyolefins, for instance, polyethylene, polypropylene, poly(butene-1), poly(pentene-1), poly (3-methylbutene-1), poly(4-methylpentene-1), various ethylene-propylene copolymers and the like.

In general, the stabilizers of this invention are employed from about 0.01 to about 5% by weight of the stabilized composition, although this will vary with the particular substrate and application. An advantageous range is from about 0.05 to about 2% and especially 0.1 to about 1%.

For addition to polymeric substrates, the stabilizers can be blended before polymerization or after polymerization, during the usual processing operations, for example, by hot-milling, the composition then being extruded, pressed, blow molded or the like into films, fibers, filaments, hollow spheres and the like. The heat stabilizing properties of these compounds may advantageously stabilize the polymer against degradation during such processing at the high temperature generally encountered. The stabilizers can also be dissolved in suitable solvents and sprayed on the surface of films, fabrics, filaments or the like to provide effective stabilization. Where the polymer is prepared from a liquid monomer as in the case of styrene, the stabilizer may be dispersed or dissolved in the monomer prior to polymerization or curing.

These compounds can also be used in combination with other additives such as antioxidants, sulfur-containing esters such as distearyl-$\beta$-thiodipropionate (DSTDP), dilauryl-$\beta$-thiodipropionate (DLTDP) in an amount of from 0.01 to 2% by weight of the organic material, and the like, pourpoint depressants, corrosion and rust inhibitors, dispersing agents, demulsifiers, antifoaming agents, fillers such as glass or other fibers, carbon black, accelerators and the other chemicals used in rubber compounding, plasticizers, color stabilizers, di- and tri-alkyl- and -alkylphenylphosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

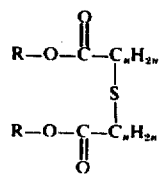

wherein R is an alkyl group having from 6 to 24 carbon atoms; and $n$ is an integer from 1 to 6. Especially useful compounds of this type are dilauryl-$\beta$-thiodipropionate and diistearyl-$\beta$-thiodipropionate. The above co-stabilizers are used in the amount of from 0.01 to 2% by weight of the organic material, and preferably from 0.1 to 1%.

Although the compounds of this invention may to some degree also be effective as thermal stabilizers, if the processing of the polymer is carried out at high temperatures it is advantageous to incorporate additional antioxidants.

In most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.005% to 5% and preferably from 0.01% to 2% by weight Representative of such antioxidants are phosphite esters, such as triphenylphosphite and dibutylphosphite and alkyl arylphosphites such as dibutylphenylphosphite, and the like.

The best results have been obtained with the preferred class of thermal antioxidants, the hindered phenols. These compounds have been found to provide the best thermal stabilization with the least discoloration in the compositions of the invention. Among these phenolic antioxidants are included the following:

di-n-octadecyl(3-5-butyl-4-hydroxy-5-methylbenzyl)malonate
2,6-di-t-butylphenol
2,2'-methylene-bis(6-t-butyl-4-methylphenol)
2,6-di-t-butylhydroquinone
octadecyl-(3,5-di-t-butyl-4-hydroxybenzylthio)acetate
1,1,3-tris(3-t-butyl-6-methyl-4-hydroxyphenyl)-butane
1,4-bis(3,5-di-t-butyl-4-hydroxybenzyl)-2,3-5,6-tetramethylbenzene
2,4-bis-(3,5-di-t-butyl-4-hydroxyphenoxy)-6-(n-octylthio)-1,3,5-triazine
2,4-bis-(4-hydroxy-3,5-di-t-butylphenoxy)-6-(n-octylthioethylthio)-1,3,5-triazine
2,4-bis-(n-octylthio)-6-(3,5-di-t-butyl-4-hydroxyanilino)-1,3,5-triazine
2,4,6-tris-(4-hydroxy-3,5-di-t-butylphenoxy)-1,3,5-triazine
n-octadecyl-$\beta$-(3,5-di-t-butyl-4-hydroxyphenyl)propionate
n-octadecyl-3,5-di-t-butyl-4-hydroxybenzoate
2-(n-octylthio)ethyl-3,5-di-t-butyl-4-hydroxybenzoate
stearamido N,N-bis-{ethylene 3-(3,5-di-t-butyl-4-hydroxyphenyl)propionate}
1,2-propylene glycol bis-{3-(3,5-di-t-butyl-4-hydroxyphenyl)propionate}
pentaerythritol tetrakis-{3-(3,5-di-t-butyl-4-hydroxyphenyl)propionate}
dioctadecyl-3,5-di-t-butyl-4-hydroxybenzylphosphonate
di-n-octadecyl-1-(3,5-di-t-butyl-4-hydroxyphenyl)-ethanephosphonate The above phenolic hydrocarbon stabilizers are known and many are commercially available.

The above antioxidants have been listed only for the purpose of illustration and it is important to note that any other antioxidant can be employed with similar improved results. The above exemplified anti-oxidants and other related antioxidants which are incorporated herein by reference, are disclosed in greater detail in the following patents: Netherlands patent specification No. 67/1119, issued Feb. 19, 1968; Netherlands patent specification No. 68/03498 issued Sept. 18, 1968; U.S. Pat. Nos. 3,255,191; 3,330,859, 3,644,482, 3,281,505; 3,531,483, 3,285,855; 3,364,250; 3,368,997; 3,357,944 and 3,758,549.

To further illustrate the present invention additional examples are presented without introducing any limitations to the description of the invention.

The compounds of this invention may be prepared by reacting a substituted piperazine dione of the formula

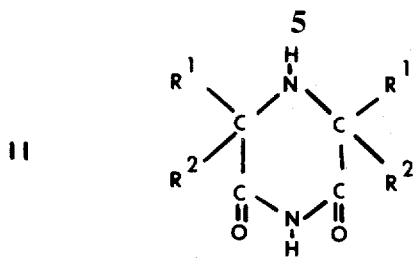

II wherein R¹ and R² are as defined above with a haloalkanoic acid. The alkylation reaction is carried out by first preparing the alkali or alkaline earth metal salt of the compound of formula II and of the haloalkanoic acid and then reacting the resulting salts in a suitable solvent such as dimethylformamide under a nitrogen atmosphere at about 75°C. Subsequent acidification converts the salt to the substituted piperazinedione carboxylic acid of formula II.

The metal salts of the present invention per se can be prepared by treating the substituted piperazinedione carboxylic acids of formula II with a reactive form of the metal or metal complex, e.g., sodium hydroxide or the like. Alternatively, and preferably in the case of metal complexes and metals other than the alkali metals, a double decomposition is employed. Thus, for example, a sodium salt of the present invention is treated with nickel chloride. In a similar fashion use of other halides such as manganese dichloride, barium chloride and the like results in formation of the corresponding metal derivative.

Compounds of formula II, wherein R¹ and R² form a mono cyclic ring with the carbon to which they are attached, may be prepared by the self condensation of a cycloalkyl amino cyanohydrin according to the procedure described by R. Sudo and S. Ichihera, Bull. Chem. Soc. Japan 36 34 (1963) and subsequent hydrolysis as described by E. F. J. Duynstee et al, Recueil de Chemie des Pays - Bas 87 945 (1968). The cycloalkylamino cyanhydrin is formed by the sequential addition of hydrogen cyanide and ammonia to a cycloalkanone as described by W. E. Noland, R. J. Sundberg and M. L. Michaelson, J. Org. Chem. 28 3576 (1963). Although the above references deal specifically with the cycloalkyl case, the procedures therein have been found to be operable in the alkyl case as well, for example, substitution of an alkanone such as acetone for the cycloalkanone such as cyclohexanone in the above procedure.

Examples of the haloalkanoic acids suitable in this invention include
α-bromoacetic acid
α-chloroacetic acid
β-bromopropionic acid
γ-bromobutyric acid
δ-bromovaleric acid
6-bromohexanoic acid
7-bromoheptanoic acid
11-bromoundecanoic acid.

The haloalkanoic acids of this invention in certain cases are commercially available materials. All of these haloalkanoic acids can be prepared by methods well known in the art.

The following examples, presented for illustration and not limitation, will further serve to typify the nature of the present invention.

EXAMPLE 1

1-Aminocyclohexanecarbonitrile

In a 200 ml - 3 necked flask equipped with a stirrer, thermometer, condenser drying tube and gas inlet tube were placed 100 g. (0.8 moles) of cyclohexanone cyanohydrin and the reaction mixture was cooled with an ice bath to 15°C. Gaseous anhydrous ammonia was introduced to the reaction mixture through the gas inlet tube for 6 hours. The reaction was then stopped and allowed to stand overnight.

The next day anhydrous ammonia was again passed through the reaction mixture for 5 hours at 25°C then dry $N_2$ was passed through the reaction mixture to entrain any excess $NH_3$. The product was then dissolved in 250 ml of benzene, the benzene solution washed two times with 250 ml of water, and the solution dried over anhydrous $Na_2SO_4$. Evaporation of the benzene yielded the product which was a slightly yellow oil.

In a similar manner, 1-aminoisobutyronitrile was prepared by substituting for cyclohexanone cyanohydrin an equivalent amount of acetone cyanohydrin.

Similarly, 1-amino-2-methyl-cyclohexanecarbonitrile is prepared by substituting for cyclohexanone cyanohydrin an equivalent amount of 2-methyl-cyclohexanone cyanohydrin.

EXAMPLE 2

Bis-(1-cyanocyclohexyl)amine

In a 1-necked round bottomed flask equipped with a capillary nitrogen inlet and an air condenser was placed 48.2 g. (0.39 moles) of 1-aminocyclohexane carbonitrile. The reaction mixture was heated in an oil bath to a bath temperature of 75°-100° over 1 hour and placed under a vacuum of using a water aspirator. The reaction was continued for 24 hours, cooled to room temperature, the vacuum released, and the crystalline mass was triturated with ether and filtered by suction, yielding 19.1 of white crystals, m.p. 133°-138°C.

In a similar manner, bis(1-cyanoisopropylamine) was prepared by substituting for 1-aminocyclohexane carbonitrile an equivalent amount of 1-aminoisobutyronitrile.

Similarly, bis-(1-cyano-2-methylcyclohexyl)amine is prepared by substituting for 1-aminocyclohexanecarbonitrile an equivalent amount of 1-amino-2-methyl cyclohexanecarbonitrile.

EXAMPLE 3

7,15-diazadispiro[5,1,5,3]hexadecane-14,16-dione

To 406 g. of 96% $H_2SO_4$ contained in a 500 ml 3-necked flask equipped with a stirrer, thermometer and powder funnel was added with stirring and cooling, 30.0 g. of powdered bis-(1-cyanocyclohexyl)amine over about a 2 hour period. The temperature of the reaction mixture was maintained at 0°-5° during the addition by using an ice bath. The reaction mixture was allowed to warm to room temperature and to stir overnight. The reaction mixture was then heated to 100°C for 1 hour, then cooled to approximately 15°C and poured onto 3000 g. of ice. The aqueous mixture was neutralized to pH 7 by the addition of approximately 800 ml of 10N NaOH. The resulting precipitate was collected by suction filtration, washed well with water, and dried in a vacuum oven, yielding a white powder, m.p. 155°–160°.

In a similar manner, 2,2,6,6-tetramethyl-3,5-diketopiperazine was prepared by substituting for bis(1-cyanohexyl)amine an equivalent amount of bis(1-cyanoisopropylamine).

Similarly, 1,9-dimethhyl-7,15-diazadispiro[5,1,5,3-]hexadecane-14,16-dione is prepared by substituting for bis-(1-cyanocyclohexyl)amine an equivalent amouont of bis-(1-cyano-2-methylcyclohexyl)amine.

EXAMPLE 4

6-(15{7,15-diazadispiro[5.1.5.3]hexadecane-14,16-dione})hexanoic acid

A. In a 500 ml 1-necked flask were placed 12.5 g (0.05 moles) of 7,15-diazadispiro[5.1.5.3.]hexadecane-14,16-dione, 200 ml of methanol and 3.26 g (0.05 moles) of 86% KOH. The mixture was swirled until solution was attained and the mixture was then evaporated to dryness under reduced pressure. In a separate 250 ml 1-necked flask were placed 9.8 g (0.05 moles) of 6-bromohexanoic acid, 100 ml of methanol and 2.03 g (0105 moles) of NaOH. The mixture was swirled and evaporated to dryness. The residue was taken up in 200 ml of dry DMF and added to the dry potassium imide salt prepared previously. A magnetic stirrer was added and the reaction mixture was heated under a ntirogen atmosphere at 75° for 20 hours. At the end of this time, the reaction mixture was allowed to cool and 800 ml of water was added. The aqueous solution was filtered with suction and the filtrate acidified with glacial acetic acid. The resulting gummy precipitate was separated by decantation and treated with methanol. The methanol solution was filtered and then evaporated under reduced pressure. The residue was recrystallized from hexane, yielding 7.5 g of white crystals, m.p. 78°–80°, of the desired material.

B. By following the above procedure (A), and substituting for the 6-bromohexanoic acid an equivalent amount of:
  a. chloroacetic acid
  b. 11-bromoundecanoic acid there was respectively obtained the following compounds:
  a. α-(15-{7,15-diazadispiro[5.1.5.3]hexadecane-14,16-dione})acetic acid, m.p. 198°–201°C
  b. 11-(15-{7,15-diazadispiro[5.1.5.3]hexadecane-14,16-dione})undecanoic acid, m.p. 100.5°–103.5°C C. By following the above procedure (A), and substituting for 7,15-diazadispiro[5.1.5.3]hexadecane-14,16-dione an equivalent amount of
  a. 2,2,6,6-tetramethyl-3,5-diketopiperazine
  b. 1,9-dimethyl-7,15-diazadispiro[5.1.5.3]hexadecane-14,16-dione
there is respectively obtained the following compounds:
  a. 6-(4-{2,2,6,6-tetramethyl-3,5-diketopiperazino})-hexanoic acid
  b. 6-(15-{1,9-dimethyl-7,15-diazadispiro[5.1.5.3]hexadecane-14,16-dione})hexanoic acid.

EXAMPLE 5

Ni(II)bis{6-[15-(7,15-diazadispiro[5.1.5.3]14,16-dione)]hexanoate} monohydrate

A. In a 500 ml 3-necked flask equipped with a stirrer, dropping funnel, thermometer, condenser and drying tube were placed 3.65 g (0.01 moles) of 6-(15-{7,15-diazadispiro[5.1.5.3]hexadecane-14,16-dione})hexanoic acid and 150 ml of methanol. To the stirred suspension was added by pipette 10 ml of 1.0 N KOH in methanol. To the solution was added dropwise with stirring over a 15-minute period a solution of 1.19 g (0.005 moles) of NiCl$_2$.6H$_2$O in 50 ml of methanol. The reaction mixture was heated at 50°C for 2 hours, then cooled and evaporated under reduced pressure. The residue was digested with an isopropanol benzene mixture and filtered by suction after the filtrate was evaporated under reduced pressure, the residue was dried under vacuum at 50° for 5 hours, yielding 3.2 g of a green glassy solid, which by Ni analysis proved to be the desired monohydrated nickel salt.

B. By following the above procedure (A), and substituting for the 6-(15-{7,15-diazadispiro[5.1.5.3]hexadecane-14,16-dione})hexanoic acid an equivalent amount of:
  a. α-(15-{7,15-diazadispiro[5.1.5.3]hexadecane-14,16-dione})acetic acid
  b. 11-(15-{7,15-diazadispiro[5.1.5.3]hexadecane-14,16-dione})undecanoic acid
there was respectively obtained
  a. nickel complex of α-{15-(7,15-diazadispiro[5.1.5.3]hexadecane-14,16-dione)}acetic acid
  b. nickel complex of 11-{15-(7,15-diazadispiro[5.1.5.3]hexadecane-14,16-dione)}undecanoic acid, green compound.

C. By following the above precedure (A), and substituting for 6-(15-{7,15-diazadispiro[5.1.5.3]hexadecane-14,16-dione})hexanoic acid an equivalent amount of:
  a. 6-(4-{2,2,6,6-tetramethyl-3,5-diketopiperazino})-hexanoic acid
  b. 6-(15-{1,9-dimethyl-7,15-diazadispiro[5.1.5.3]hexadecane-14,16-dione})hexanoic acid
there is respectively obtained
  a. nickel complex of 6-{4-(2,2,6,6-tetramethyl-3,5-diketopiperazino)} hexanoic acid
  b. nickel complex of 6-(15-{1,9-dimethyl-7,15-diazadispiro[5.1.5.3]hexadecane-14,16-dione})-hexanoic acid.

EXAMPLE 6

By essentially following the procedure of Example 5A and substituting the following metal complexes for nickel chloride:
  a. manganese chloride
  b. zinc chloride
  c. ferric chloride
  d. cobalt(ous) chloride
  e. stannous chloride
there is thus respectively obtained:
  a. manganese complex of 6-{15-(7,15-diazadispiro[5.1.5.3]hexadecane-14,16-dione)}hexanoic acid
  b. zinc complex of 6-{15-(7,15-diazadispiro[5.1.5.-3]hexadecane-14,16-dione)}hexanoic acid
  c. iron complex of 6-{15-(7,15-diazadispiro[5.1.5.3]hexadecane-14,16-dione)}hexanoic acid
  d. cobalt(ous) chloride complex of 6-{15-(7,15-diazadispiro[5.1.5.3]hexadecane-14,16-dione)}hexanoic acid
  e. stannous chloride complex of 6-{15-(7,15-diazadispiro[5.1.5.3]hexadecane-14,16-dione)}hexanoic acid.

EXAMPLE 7

Artifical Light Exposure Test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an artificial light exposure device is described below:

a. Sample Preparation 5 mil Film — Unstabilized polypropylene powder (Hercules Profax 6501) is thoroughly blended with the indicated amounts of additives. The blended material is then milled on a two roll mill for 5 minutes at 182°C. The milled sheet is then compression molded at 220°C into 5 mil thick film under a pressure of 175 psi and water cooled in the press.

b. Testing Method

This test is conducted in a FS/BL unit, basically of the American Cyanamid design, which consists of 40 tubes of alternating fluorescent sunlamps and black lights (20 of each). The 5 mil sample film which are mounted on 3 inches × 2 inches IR card holders with ¼ inch × 1 inch windows and are placed on a rotating drum 2 inches from the bulbs in the FS/BL unit. The time in hours is noted for the development of 0.5 carbonyl absorbance units as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight percent based on the weight of the polymer.

TABLE I

Light Stabilization Data in Polypropylene

| Additive | Time in Hours to .5 Carbonyl Absorbance Units | |
|---|---|---|
| | Formulation A* | Formulation B** |
| α-(15-{7,15-diaza-dispiro[5.1.5.3]hexadecane-14,16-dione}) acetic acid nickel complex of α-{15-(7,15-diazadispiro[5.1.5.3]hexadecane-14,16-dione)}acetic acid | 655 | 1215 |
| | 1235 | 2465 |
| 6-(15-{7,15-diazadispiro[5.1.5.3]hexadecane-14,16-dione})hexanoic acid | 835 | 1765 |
| 11-(15-{7,15-diazadispiro[5.1.5.3]hexadecane-14,16-dione})undecanoic acid | 1040 | 2140 |
| nickel complex of 6-(15-{7,15-diazadispiro[5.1.5.3]hexadecane-14,16-dione}) hexanoic acid | 755 | 2050 |
| nickel complex of 11-(15-{7,15-diazadispiro[5.1.5.3]hexadecane-14,16-dione})undecanoic acid | 1205 | 2550 |
| Control | 220 | 640 |

*Formulation A contains 0.5% additive and 0.2% antioxidant dioctadecyl 3,5-di-t-butyl-4-hydroxybenzylphosphonate

**Formulation B contains 0.25% additive, 0.25% UV absorber 2(2'-hydroxy-3',5'-di-t-butylphenyl)-5-chlorobenzotriazole, and 0.2% antioxidant di-octadecyl 3,5-di-t-butyl-4-hydroxybenzylphosphonate.

Proportionately good stabilization is obtained when in the compositions of Table I the compounds of this invention are present in the concentrations of 0.1% and 1%.

Other hindered phenolic antioxidants may be used in place of di-octadecyl(3,5-di-t-butyl-4-hydroxybenzyl)-phosphonate in the above mentioned compositions for example, di-n-octadecyl α-(3-t-butyl-4-hydroxy-4-methylbenzyl)malonate, 2,4-bis(n-octylthio)-6-(3,5-di-t-butyl-4-hydroxyaniline)-1,3,5-triazine, octadecyl 3-(3',5'-di-t-butyl-4'-hydroxyphenyl)propionate, pentaerithritol-tetrakis{3-(3,5-di-t-butyl-4-hydroxyphenyl)-}propionate, tris-(3,5-di-t-butyl-4-hydroxybenzyl)isocyanurate, 2,6-di-tert-butyl-4-methylphenol, N,N,N-tris-(3,5-di-tert-butyl-4-hydroxybenzyl)isocyanurate, and 2,4,6-tris(3,5-di-tert-butyl-4-hydroxybenzyl)-1,3,5-trimethylbenzyl.

The compositions of Table I are also stabilized when 2(2'-hydroxy-3',5'-di-t-butylphenyl)-5-chlorobenzotriazole is replaced with the following UV absorbers:

a. 2-hydroxy-4-methoxy-5-sulfobenzophenone trihydrate
b. 2-hydroxy-4-n-octoxybenzophenone
c. {2,2'-thiobis(4-t-octylphenolate)}-n-butylamine nickel II
d. p-octylphenyl salicylate
e. 2,2'-dihydroxy-4,4'-dimethoxybenzophenone
f. 2(2'-hydroxy-5'-methylphenyl)-benzotriazole.

EXAMPLE 8

High impact polystyrene resin containing elastomer (i.e., butadiene-styrene) is stabilized against loss of elongation properties due to exposure to ultraviolet light by incorporation of 0.3% by weight of 6-(15-{7,15-diazadispiro[5.1.5.3]hexadecane-14,16-dione})hexanoic acid.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips approximately 4 × 0.5 inches. A portion of these strips is then measured for percent of elongation in the Instron Tensile Testing Apparatus (Instron Engineering Corporation, Quincy, Massachusetts). The remaining portions of the strips are placed in an FS/Bl chamber according to Example 7B except that the samples are mounted and white cardboard stock and the time to 50% reduction in elongation is measured. The stabilized polystyrene resin retains its elongation property longer than the unstabilized resin.

EXAMPLE 9

Unstabilized linear polyethylene is solvent blended in methylene chloride with 0.5% by weight of the substrate of the nickel complex of α-{15-(7,15-diazadispiro[5.1.5.3]hexadecane-14,16-dione)} acetic acid and then vacuum dried. The resin is then extrusion compounded on a 1 inch 24/1=L/D extruder, melt temperature 450°F (232°C) and pressed for 7 minutes at a temperature of 163°C and a pressure of 2000 psi into a sheet of uniform thickness of 100 mil. The sheets are then cut into plaques of 2 inch × 2 inch. The plaques are then exposed in a FS/BL exposure device and color measurements made periodically using a Hunter Color Difference Meter Model D25. Polyethylene stabilized with the above compound is found to be much more stable than the unstabilized polyethylene or the polyethylene stabilized only with an antioxidant.

EXAMPLE 10

A quantity of SBR emulsion containing 100 g of rubber (500 ml of 20% SBR obtained from Texas U.S., Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1mm) at 40°–45°C.

The dried rubber (25 g) is heated under nitrogen at 125°C in a Brabender mixer and to this is added with mixing 0.25 g (0.5%) of 11-(15-{7,15-diazadispiro[5.1.5.3]hexadecane-14,16-dione})undecanoic acid. The composition is mixed for 5 minutes after which it is cooled and compression molded at 125°C into 5 inches ×0.025 inch plaques.

The plaques are exposed to a xenon arc weatherometer and the color measurement (L-b) is made after 45, 125 and 290 hours. The samples stabilized with the above compound are found to be much more light stable than the unstabilized samples.

EXAMPLE 11

To 50 g of polyacetal resin containing 0.1% of an acid scavenger, dicyandiamide, is added 0.2% by weight of the nickel complex of 6-(15,{7,15-diazadispiro[5.1.5.3]hexadecane-14,16-dione})hexanoic acid and milled for 7 minutes at 200°C in a Brabender Plasti-recorder. The milled formulation is subsequently pressed into a 40 mil sheet at 215°C at 350 psi for 90 seconds then cooled quickly in a cold press at 350 psi. The stabilized sheets are then remolded for 2 minutes at contact pressure and for 3 minutes at 300 psi at 215°C to give plaques 1½ inch × 2¼ inch × 125 mil. Thereafter, the testing procedure of Example 9 is followed to determine the light stability of the samples. The stabilized samples are found to be much more stable than the unstabilized samples.

EXAMPLE 12

Unstabilized thoroughly dried polyethylene terephthalate chips are dry blended with 1.0% of 6-(4-{2,2,6,6-tetramethyl-3,5-diketopiperazino})hexaoic acid. 60/10 denier multifilament is melt spun at a melt temperature of 290°C. The oriented fiber is wound on white cards and exposed in a Xenon Arc Fadeometer. Color measurements are made periodically with a Hunter Color Difference Meter Model D25. The stabilized samples are found to be much more light stable than the un-stabilized samples.

EXAMPLE 13 a. A composition comprising acrylonitrilebutadienestyrene terpolymer and 1% by weight of the nickel complex of α-{15-(7,15-diazadispiro[5.1.5.3]hexadecane-14,16-dione)}acetic acid resists embrittlement due to exposure to ultraviolet light longer than one which does not contain the stabilizer.

b. A composition comprising polyurethane prepared from toluene diisocyanate and alkylene polyols and 1.0% by weight of α-(15-{7,15-diazadispiro[5.1.5.3]-hexadecane-14,16-dione})acetic acid is more stable to sunlight, fluorescent sunlamps, black lights and fluorescent lights than the unformulated polyurethane.

c. A composition comprising a polycarbonate prepared from bisphenol-A and phosgene and 1% by weight of 6-(15-{7,15-diazadispiro[5.1.5.3]hexadecane-14,16-dione})hexanoic acid resists discoloration due to exposure to ultraviolet light longer than one which does not contain the stabilizer.

d. A composition comprising polymethylmethacrylate and 0.25% by weight of the nickel complex of 11-(15-{7,15-diazadispiro[5.1.5.3]hexadecane-14,16-dione})undecanoic acid resists discoloration due to exposure to ultraviolet light longer than one which does not contain the stabilizer.

EXAMPLE 14 a. A stabilized polyamide (nylon 6,6) is prepared by incorporating therein 0.1% 6-(15-{1,9-dimethyl-7,15-diazadispiro[5.1.5.3]hexadecane-14,16-dione})hexanoic acid. The light stability of the stabilized composition is superior to that of an unstabilized polyamide.

b. A stabilized polyphenylene oxide polymer (prepared by polymerizing 2,6-dimethylphenol is prepared by incorporating therein 0.5% by weight of the manganese complex of 6-{15(7,15-diazadispiro[5.1.5.3]hexadecane-14,16-dione})hexanoic acid. The stabilized compositions resist embrittlement due to exposure to ultraviolet light longer than one which does not contain the stabilizer.

c. A stabilized crystalline polystyrene is prepared by incorporating therein 0.1% by weight of the zinc complex of 6-{15-(7,15-diazadispiro[5.1.5.3]hexadecane-14,16-dione})hexanoic acid. The stabilized composition resists embrittlement due to exposure to ultraviolet light longer than one which does not contain the stabilizer.

Antioxidants may also be incorporated into each of the above mentioned compositions, for example, di-n-octadecyl-α,α'-bis(3-butyl-4-hydroxy-5-methylbenzyl) malonate 2,4-bis(4-hydroxy-3,5-di-t-butylphenoxy)-6-(n-octylthioethylthio)-1,3,5-triazine, 2,4-bis(3,5-di-t-butyl-hydroxyphenoxy)-6-(n-octylthio)-1,3,5-triazine di-n-octadecyl 3(3',5'-di-t-butyl-4-hydroxyphenyl)propionate, respectively.

What is claimed is:

1. A compound of the formula

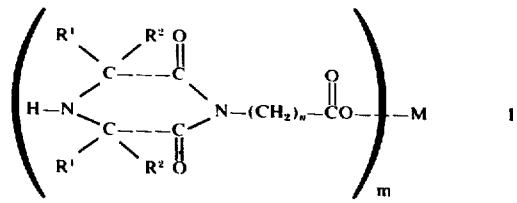

wherein
R¹ and R² are independently of each other methyl or ethyl or together with the carbon to which they are bound form a cyclopentyl or cyclohexyl ring, which is unsubstituted or substituted with a methyl group;

$n$ is an integer of from 1 to 12;

M is hydrogen, or a metal selected from the group consisting of barium, nickel, manganese, calcium, zinc, iron, sodium, cobalt, and tin; and $m$ has a value of from 1 to 4, the value of $m$ being the same as the available valence of M.

2. A compound according to claim 1, wherein $n$ is an integer of from 1 to 10;

M is hydrogen or a metal selected from nickel and manganese; and $m$ has a value of 1 or 2, the value of $m$ being the same as the available valence of M.

3. A compound according to claim 2, wherein $R^1$ and $R^2$ are independently of each other methyl or ethyl.

4. A compound according to claim 2, wherein $R^1$ and $R^2$ are methyl.

5. A compound according to claim 2 wherein $R^1$ and $R^2$ together with the carbon to which they are bound form a cyclohexyl ring.

6. A compound according to claim 2, wherein M is hydrogen or nickel.

7. A compound according to claim 6, which is α-(15-{7,15-diazadispiro[5.1.5.3]hexadecane-14,16-dione}) acetic acid.

8. A compound according to claim 6, which is α-15-{(7,15-diazadispiro[5.1.5.3]hexadecane-14,16-dione})acetic acid.

9. A compound according to claim 6, which is 6-(15-{7,15-diazadispiro[5.1.5.3]hexadecane-14,16-dione})-hexanoic acid.

10. A compound according to claim 6, which is 11-(15-{7,15-diazadispiro[5.1.5.3]hexadecane-14,16-dione})undecanoic acid.

11. A compound according to claim 6, which is a nickel complex of 6-(15-{7,15-diazadispiro[5.1.5.3]hexadecane-14,16-dione})hexanoic acid.

12. A compound according to claim 6, which is a nickel complex of 11-(15-{7,15-diazadispiro[5.1.5.3]hexadecane-14,16-dione})hexanoic acid.

* * * * *